IMPROVEMENTS IN FLEXIBLE TAPE HANDLING APPARATUS

Filed Nov. 19, 1957 2 Sheets-Sheet 1

INVENTORS
ROBERT E. WILKINS
DEXTER C. SMITH
WILLIAM G. FLIEDER
BY Henry L. Hanson
ATTORNEY July 4, 1961 R. E. WILKINS ET AL 2,990,990

IMPROVEMENTS IN FLEXIBLE TAPE HANDLING APPARATUS

Filed Nov. 19, 1957 2 Sheets-Sheet 2

INVENTOR.
ROBERT E. WILKINS
DEXTER C. SMITH
WILLIAM G. FLIEDER

BY Henry L. Hanson
ATTORNEY 2,990,990

IMPROVEMENTS IN FLEXIBLE TAPE HANDLING APPARATUS

Robert E. Wilkins, Wollaston, Dexter C. Smith, North Quincy, and William G. Flieder, Allston, Mass., assignors to Minneapolis-Honeywell Regulator Company, Minneapolis, Minn., a corporation of Delaware Filed Nov. 19, 1957, Ser. No. 697,392

6 Claims. (Cl. 226—97)

A general object of the present invention is to provide new and improved apparatus for the handling of an elongated flexible tape. More specifically, the invention is concerned with a new and improved apparatus for improving the operational characteristics of a loop chamber associated with a tape handling mechanism.

In many forms of tape feeding or supplying means, it is customary to provide a tape supply reel which feeds the tape to a utilization apparatus. As the effective reel diameter varies with the amount of tape on the reel, the speed of the tape as it comes from the reel varies if the reel is driven at a constant speed. One way of eliminating the effect of the reel speed variations at the utilization device is to provide a tape loop, which may well be within a chamber, between the supply reel and the tape utilization apparatus. By this type of apparatus it is possible for the utilization apparatus to pass the tape at a uniform speed since the tape is fed from the loop chamber to the utilization apparatus instead of directly from the supply reel. When the tape is moved through a loop chamber, there is a tendency for electrostatic charges to build up and the resultant electrostatic attraction between the tape and the sides of the loop chamber produces a heavy drag on the tape which may materially affect the functioning of the tape utilization apparatus. The frictional coefficient between the sides of the loop chamber and the tape may also introduce an adverse drag on the tape to further impede the operation of the tape utilization apparatus.

The present invention provides a new and improved means for minimizing the aforementioned adverse effects inherent in a loop chamber having flat planar sides which would normally engage the tape. In accordance with the provisions of the present invention, the sides of the loop chamber adjacent the tape are formed with a plurality of raised or embossed surfaces which contact the tape in the loop chamber at a minimum number of points to thereby minimize the contacting surface of the chamber side with respect to the tape. This has the effect of minimizing the electrostatic charges that will be built up and further minimizing the frictional drag that is normally present when the tape engages a flat surface in the chamber.

It is, therefore, a further more specific object of the present invention to provide a new and improved tape loop chamber wherein at least one of the sides of the loop chamber which engages the tape has the tape engaging surface thereof formed with embossed surfaces to minimize the amount of electrostatic attraction in the chamber and further minimize the mechanical or frictional drag on the tape.

In apparatus utilizing magnetic recording tapes, it is essential that the surfaces within the loop chamber be extremely smooth so as not to scratch or otherwise mar the surface of the tape as it is passed through the loop chamber. In accordance with the principles of the present invention, the embossed surfaces provided on the active loop chamber sides may well be finished smooth so as to minimize the surface variations and may be further provided with a thin plastic coating which will further serve to protect the tape as it moves through the loop chamber.

It is therefore a still further more specific object of the present invention to provide a new and improved loop chamber for a tape wherein the loop chamber sides which are normally engaging the tape have embossed surfaces with a plastic protective coating formed on the surfaces to minimize the frictional wear of the loop chamber on the tape as it is passed therethrough.

The foregoing and other features of novelty which characterize the invention are pointed out with particularity in the claims annexed to and forming a part of the present specification. For a better understanding of the invention, its advantages, and specific objects attained with its use, reference should be had to the accompanying drawings and descriptive matter in which there are illustrated and described preferred embodiments of the invention.

Figure 1:
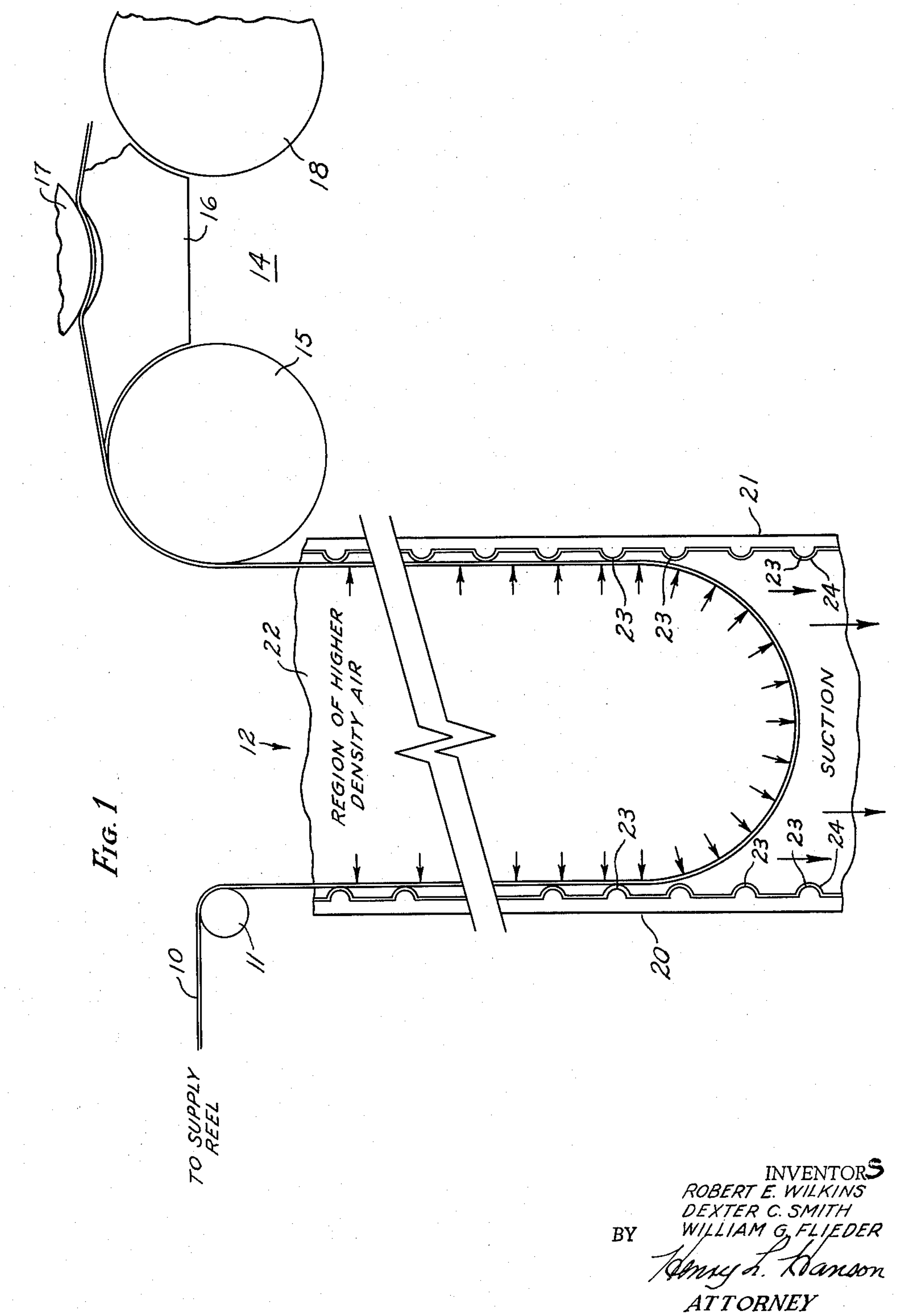
FIGURE 1 is a view of a tape handling mechanism incorporating the principles of the present invention.

Referring first to FIGURE 1, the numeral 10 represents an elongated flexible tape. This elongated flexible tape, in one preferred embodiment of the invention, comprised a relatively wide magnetic tape formed of a plastic base material with a suitable magnetic recording material formed on one side of the base. The tape 10 is adapted to be stored on a supply reel, not shown, and fed therefrom over a suitable guide member 11 into a loop chamber 12. From the loop chamber 12, the tape is adapted to pass to a tape utilization apparatus 14 which includes, in combination, a pneumatic drive capstan 15, a pneumatic brake mechanism 16, and a data transfer head 17 and a further drive capstan 18. A representative form of utilization apparatus may be more fully understood by reference to a co-pending application of Robert A. Pendleton, bearing Serial Number 586,209, filed May 21, 1956, now Patent No. 2,866,637.

In practice, the tape 10 is fed from a supply reel past the guide member 11 into the loop chamber where the tape 10 is adapted to move up and down in accordance with the requirements of the tape by the tape utilization apparatus 14. The movement of the tape from the loop chamber 12 is controlled by one or the other of the drive capstans 15 or 18 of the tape utilization apparatus. As will be more fully understood by reference to the aforementioned application of Robert A. Pendleton, the tape may be started and stopped by the selective application of a subatmospheric pressure to one or the other of the drive capstans 15 and 18 or the brake assembly 16. As the tape 10 is moved past the data transfer head 17, information may be recorded on or read from the tape in a manner well known in the art.

Considering the construction of the loop chamber more specifically, it will be seen to comprise a pair of oppositely disposed plates which are suitably mounted on a back plate 22. The chamber is closed on the side of the tape opposite the plate 22, said plate not being shown. The maintaining of the tape within the loop chamber is accomplished by applying a subatmospheric pressure, or a pneumatic suction, to the lower extremity of the loop chamber so that the atmospheric pressure will tend to force the tape loop down into the chamber.

If the loop chamber sides 20 and 21, which are adapted to engage the flat side of the tape 10 were flat, there would be considerable mechanical friction between the tape and sides of the tape end of the chamber 12. In addition, the movement of the tape over these surfaces would tend to generate electrostatic charges which would cause a further electrostatic attraction between the tape 10 and the sides of the loop chamber. This additional electrostatic drag may be sufficient, particularly under certain types of atmospheric conditions conducive to the generation of electrostatic charges, to render the tape utilization apparatus ineffective for any useful purpose.

To minimize the effects of mechanical friction and electrostatic attraction, the sides of the loop chamber 20 and 21 have a plurality of embossed surfaces 23 formed on the side thereof. It will be apparent from the drawing that the tape will actually contact only the top surface of these embossed surfaces so that there is a minimum of frictional engagement and contact between the tape and the sides of the loop chamber. This reduction of the area of contact has been effected without materially altering the effect of the vacuum or subatmospheric pressure tending to maintain the tape well within the loop chamber.

Figure 2:
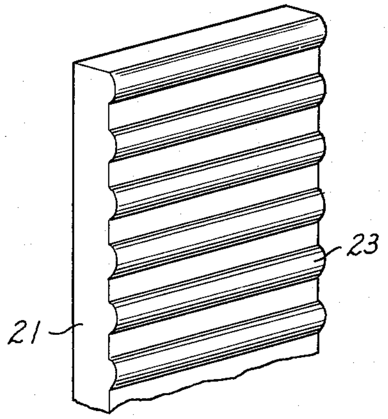
FIGURE 2 shows one manner in which the loop chamber sides may be formed.
Figure 3:
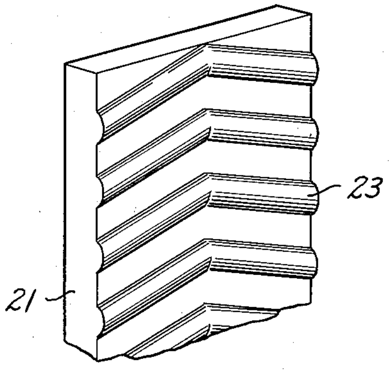
FIGURE 3 shows a further view of a different form of loop chamber side.
Figure 4:
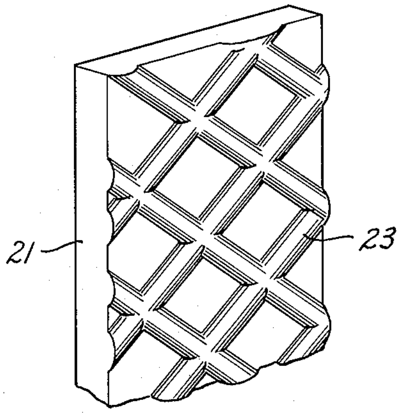
FIGURE 4 shows a still further modified form of surface for a loop chamber side.

A perspective view of one section of a chamber side as illustrated in FIGURES 2, 3, and 4 is representative of how the chamber sides may be formed. Thus, in FIGURE 2, the wall 21 may have a plurality of corrugated type formations extending laterally across the surface of the wall.

In FIGURE 3, the embossed surface takes the form of an inverted V shape member or surface which is rounded on the outer edge. The particular advantage of this configuration over that of FIGURE 2 is the minimization of air flow turbulence about the tape which may set up undesirable sonic vibrations in the tape while it is in the loop chamber.

The plate 21 may also be formed as shown in FIGURE 4 wherein a series of diagonal type embossed surfaces are crossed on the surface of the side plate 21.

It will be readily apparent that there are other forms of configuration that will be equally suitable for minimizing the area of contact between the tape and the plate.

Inasmuch as the tape has a magnetic coating thereon, it will be readily apparent that the tape engaging surfaces must be very smooth even though the magnetic coating may be on the side opposite that which actually engages the wall of the loop chamber.

In order to provide a smooth surface, it is possible to provide a high polish on the surface of the embossed areas. In addition, it may be desirable to provide a thin protective plastic coating on the surfaces to further minimize wear between the plastic tape and these contact areas. This may readily be accomplished, as shown in FIGURE 1, by the placing of a thin coating of a plastic material 24, such as Teflon over the entire surface. It will be readily apparent that other coatings, such as nylon, Mylar, and the like, may also be used to good advantage.

While, in accordance with the provisions of the statutes, there has been illustrated and described the best form of the invention known, it will be apparent to those skilled in the art that changes may be made in the forms of the apparatus disclosed without departing from the spirit of the invention as set forth in the appended claims, and that in some cases, certain features of the invention may be used to advantage without a corresponding use of other features.

Having now described the invention, what is claimed as new and for which it is desired to secure by Letters Patent is:

1. In combination, an elongated flexible tape, a tape supply reel, a tape utilization means, a tape loop chamber, said tape extending from said supply reel through said loop chamber and past said utilization means, said loop chamber having a subatmospheric pressure applied thereto tending to draw the tape into said chamber, and means forming on an inner surface of said chamber an irregular tape contacting surface comprising a plurality of ridged extensions positioned laterally of the path of travel of the tape in said chamber, said ridged extensions having a surface formed of a material which is substantially frictionless with respect to said tape as it is moved in said chamber.

2. In combination, an elongated flexible tape adapted to be transferred to or from a supply reel past a tape utilization means, and a tape loop chamber positioned between said supply reel and said tape utilization means, said loop chamber having a pair of displaced sides which are on a plane parallel to the flat portion of said tape, said pair of sides having uniformly characterized embossed surfaces which are non-linear with respect to the path of travel of the tape and being formed on the inner tape engaging side to minimize the contacting surface between said sides and said tape, said surfaces being formed of a material having substantially frictionless contact with said tape as it moves in said chamber.

3. In combination, an elongated flexible tape, a tape supply reel, a tape utilization means, a tape loop chamber, said tape extending from said supply reel through said loop chamber and past said utilization means, said loop chamber having a differential pressure applied thereto tending to draw the tape into said chamber, and means forming on an inner surface of said chamber an irregular tape contacting surface comprising a plurality of extension positioned laterally of the path of travel of the tape in said chamber, said extensions having a smooth plastic coated surface whose coefficient of friction with respect to said tape is relatively low 4. An elongated loop chamber for a movable flexible tape comprising a pair of rectangular plates forming the opposite sides of said chamber, both of said pair of plates having inner surfaces which are adapted to be engaged by the flat side of said tape and at least one of said plates having the inner surface thereof embossed with projections which are non-linear with respect to the path of travel of the tape to hold the tape in the chamber displaced from the main surface of said plate, said projections having a surface formed of a material having a low coefficient of friction with respect to said tape, and pressure control means connected to said chamber to create a pressure differential along the length of said chamber to maintain said tape under tension in said chamber and in engagement with said inner surfaces.

5. In combination, an elongated flexible tape adapted to be transferred to or from a supply reel past a tape utilization means, and a tape loop chamber positioned between said supply reel and said tape utilization means, said loop chamber comprising a pair of sides which are on a plane which is substantially parallel to the adjacent flat side of said tape when in the loop chamber, at least one of said pair of sides having an embossed surface on the inner tape engaging side to minimize the extent of the contacting of said sides by said tape, said surface engaging said tape being formed of a material having a relatively low coefficient of friction at the points of engagement with said tape and positioned non-linearly with respect to the path of travel of the tape.

6. A loop chamber for a movable tape comprising a pair of rectangular plates forming the opposite sides of said chamber and positioned with its lateral surface parallel to the flat side of the tape, a suction source connected to one end of said chamber, and means formed on at least one side of said chamber to hold the tape displaced from the main body of said one side and contacting said tape at a plurality o points, said means comprising at least one tape engaging means formed of a material having a low coefficient of friction and having an arcuate tape engaging surface extending laterally to the path of tape travel in said chamber.

References Cited in the file of this patent

UNITED STATES PATENTS

| | | |
|---|---|---|
| 1,409,767 | Perry | Mar. 14, 1922 |
| 2,213,296 | Zinser | Sept. 3, 1940 |
| 2,338,770 | Leguillon | Jan. 11, 1944 |
| 2,409,770 | Lorig et al. | Oct. 22, 1946 |
| 2,517,861 | Franklin | Aug. 8, 1950 |
| 2,792,217 | Weidenhammer et al. | May 14, 1957 |
| 2,804,299 | Robertson | Aug. 27, 1957 |

FOREIGN PATENTS

| | | |
|---|---|---|
| 611,436 | Germany | Mar. 27, 1935 |
| 664,511 | Great Britain | Jan. 9, 1952 |
| 679,375 | Great Britain | Sept. 17, 1952 |